Sept. 5, 1967  H. H. STILLEY ETAL  3,340,450
VARIABLE SPEED A.-C. MOTOR CONTROL
Filed May 25, 1965  5 Sheets-Sheet 1

INVENTORS
HERSCHEL H. STILLEY
KENNETH S. KORDIK
by: Wolfe, Hubbard, Voit & Osann
ATTYS.

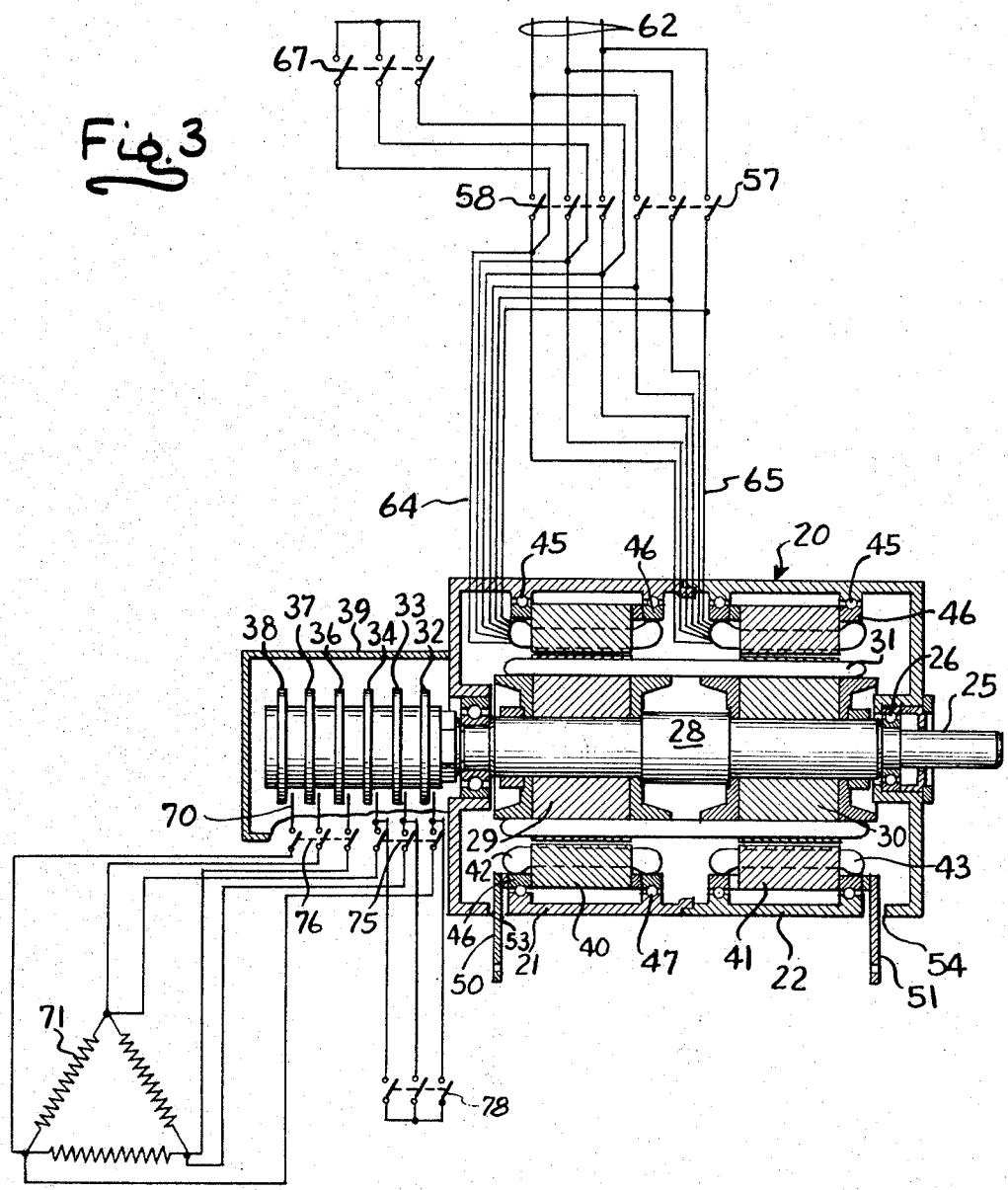

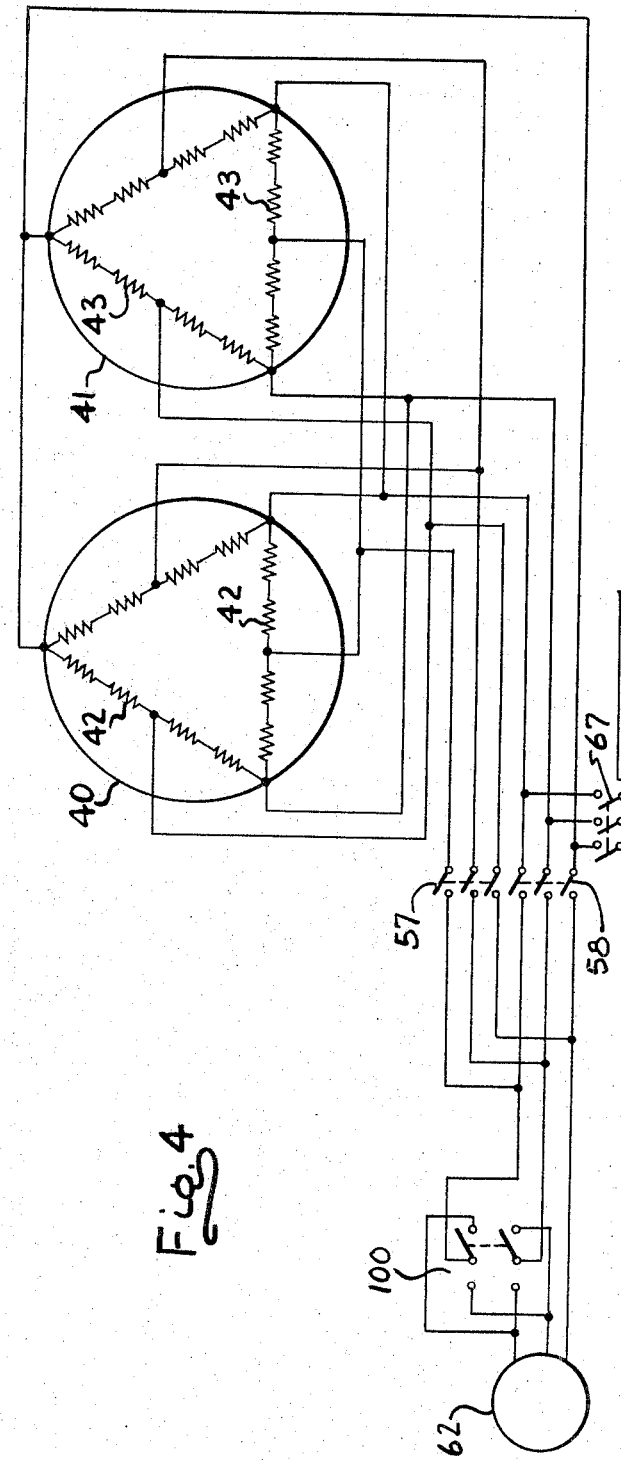
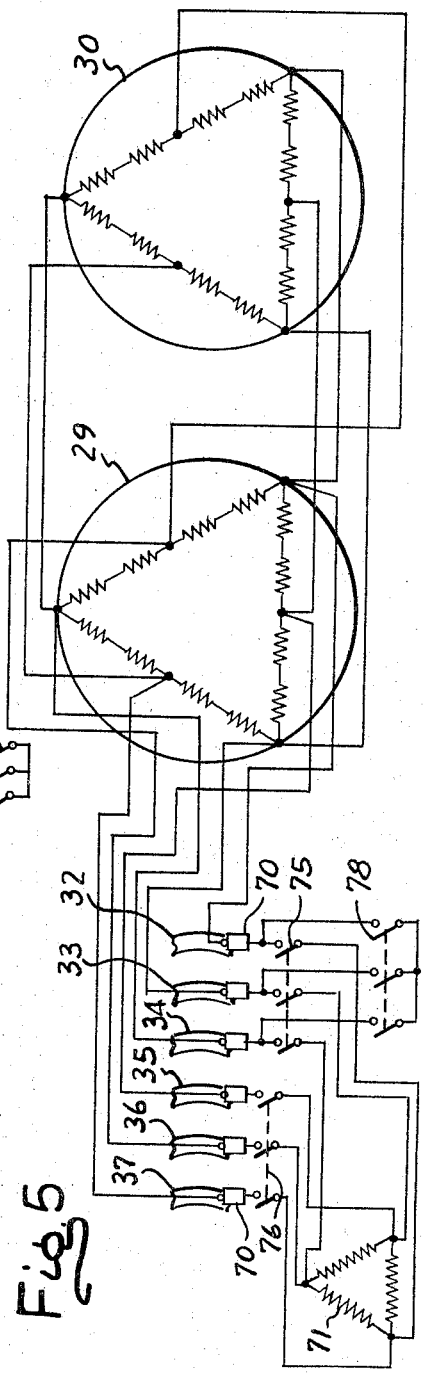
Fig. 4
Fig. 5
INVENTORS
HERSCHEL H. STILLEY
KENNETH S. KORDIK
by: Wolfe, Hubbard, Voit & Osann
ATTYS.

United States Patent Office 3,340,450
Patented Sept. 5, 1967

3,340,450
VARIABLE SPEED A.-C. MOTOR CONTROL
Herschel H. Stilley and Kenneth S. Kordik, Rockton, Ill., assignors to Warner Electric Brake & Clutch Company, South Beloit, Ill., a corporation of Delaware
Filed May 25, 1965, Ser. No. 458,626
9 Claims. (Cl. 318—214)

The present invention relates generally to control of A.-C. motors and more particularly to an improved induction motor with controllable speed-torque characteristics, yet which is capable of transmitting constant or substantially constant horsepower at varying speeds. In its principal aspect, the invention is concerned with improved variable speed A.-C. motors and control thereof suitable for use in electric drive systems, such as that capable of propelling, braking and steering heavy duty off-highway type vehicle equipment.

It is an object of the present invention to provide an improved alternating current induction motor having variable selected speeds wherein the torque-speed characteristics can be further controlled between the selected high and low operating speeds.

A further object of the present invention is to provide an improved variable A.-C. induction motor wherein the motor speeds may be varied at substantially constant horsepower. In this connection, it is an object to provide an improved A.-C. motor which can be operated at high efficiency yet which will give as high an efficiency at half speed as obtained at full speed.

It is still a further object to provide an A.-C. motor which can be switched to selected high and low operating speeds wherein the torque output is substantially increased at the low speeds. Thus, the present motor is well suited for use as a transmission or the like which can be shifted from high torque, low speeds to lower torque, high speeds.

More specifically, it is an object to provide an A.-C. motor control system which employs a variable speed motor of the type having two relatively adjustable stators cooperating with a single rotor in which the motor characteristics at varying selected speeds are further controlled by varying the physical phase position of the two stators relative to one another, but which incorporates a number of important improvements that make the motor control especially suitable for off-highway application on fixed or mobile equipment. While not so limited in its application, the present invention will find particular usefulness as a drive system for cranes, tracked vehicles, military vehicles and earthmoving vehicles or the like.

It is another related object to provide an A.-C. motor control for use with dual, relatively adjustable, stator motors in which the speed may be changed by varying the number of winding poles by switching for selected high and low speeds and wherein the stators may be positioned to further control the speed-torque characteristics between given selected speeds.

It is an object of the invention in one of its aspects to provide in A.-C. driving arrangement which is ideally suited for control of heavy duty off-highway equipment which provides controlled variable speeds, and which is capable of accelerating and decelerating, dynamic braking and reversing while avoiding the necessity for expensive transmissions, clutches or torque convertors usually required for vehicle drive systems.

Other objects and advantages of the invention will become apparent upon reference to detailed description and attached drawings in which:

FIGURE 1 is an elevation view of an exemplary motor and control mechanism embodying the features of the present invention, such apparatus here shown in the high speed, reversing position;

FIG. 2 is a fragmentary, front end view, partially in section, taken along the line 2—2 in FIG. 1;

FIG. 3 is a longitudinal section taken along the line 3—3 in FIG. 2;

FIG. 4 is a diagram of one form of electrical circuit for use with the stators of the motor of FIG. 1;

FIG. 5 is a diagram of one form of electrical circuit for use with the rotor of the motor of FIG. 1;

Figure 6:
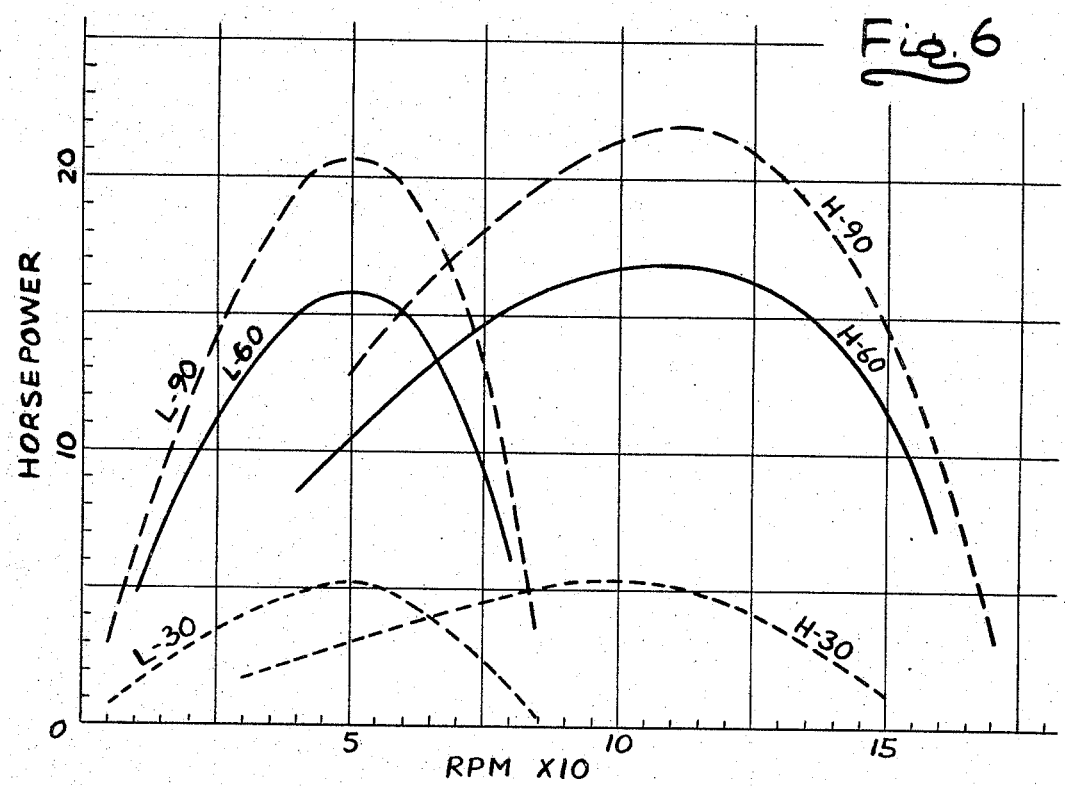
FIG. 6 shows a family of motor horsepower versus speed curves obtainable at successive stator adjustments for high and low speeds.

While the invention has been susceptible of various modifications and alternative forms, a specific embodiment thereof has been shown by way of example in the drawings which will herein be described in detail. It should be understood, however, that it is not intended to limit the invention to the particular form disclosed, but, on the contrary, the intention is to cover all modifications, equivalents, and alternatives falling within the spirit and scope of the invention as expressed in the appended claims.

Referring now to the drawings, particularly FIGS. 1–3, there is shown a motor 20 having a frame which consists of a pair of cup-shaped members 21, 22 connected together to define a cylindrical housing. Extending axially through the housing is a rotor shaft 25 mounted in suitable bearings 26.

Secured to the shaft 25 is a rotor assembly indicated generally at 28 which, in the present instance, includes two portions 29, 30. Engaging both portions of the rotor is a winding 31, preferably of "wound" type which is brought out to slip rings 32–37, inclusive. A cup-shaped enclosure member 39 secured to the left-hand housing member 21, as viewed in FIG. 1, is provided to enclose the slip rings.

Spaced side by side in the frame and alined with the portions 29, 30, of the rotor are stator assemblies 40, 41, having windings 42, 43, respectively, to be described in more detail hereinbelow.

Referring to FIGS. 1 and 3, conjointly, the stator assemblies 40, 41 are, respectively, telescoped over the rotor portions 29, 30, so that the rotating magnetic fields generated by the stator assemblies induces current in their respective rotor portions, creating a secondary rotor field, with the interaction of the stator field and the secondary rotor field producing the rotation and torque of the motor. Each of the stator assemblies is rockably supported within the housing 20, and are supported by suitable bearings, which in the present instance includes balls 45 which ride in annular grooved members 46 secured to the stators and grooves 47 formed on the inside of the housing members 21, 22.

For the purpose of rotating the stator assemblies, there is provided a pair of arms 50, 51, connected to the stator assemblies 40, 41, respectively, and extending radially outward through slots 53, 54, provided in the motor housing.

As hereinafter described, the arms 50, 51 permit the application of rotational movement to the stators 40, 41, respectively, for positioning of the stators with respect to one another in order to adjust the electrical phase relation between the voltages induced by the stators in the rotor winding. That is, the stators may be oriented with respect to one another to produce a null phase position in which the voltages induced by the stators are opposite in phase and cancel one another so that the torque applied to the rotor is zero, the stators may be adjusted to a position in which the induced voltages are additive for the production of maximum torque, or the stators can be adjusted for any of an infinite number of resultant voltages between the maximum and null phase positions.

In accordance with one of the aspects of the invention, means are provided for selectively controlling the speed of the motor by switching the number of poles in the stator and wound rotor circuits to provide, for example, low and high speeds of 900 and 1800 r.p.m. for eight and four poles, respectively, or 600 and 1200 r.p.m., utilizing twelve and six poles, respectively. Thus, referring to FIGS. 3 and 4, the latter showing the stator windings diagrammatically, wherein the stator units 40, 41 receive, respectively, the stator windings 42, 43, and the terminals of which are connected by disconnect switches 57, 58, leading to a source of polyphase voltage, shown for convenience as a three-phase source, indicated at 62. Each of the stators have six leads 64, 65, leading to the terminals of the respective stator windings. The leads 64 and 65 are so arranged that with the voltages applied from the source 62, the rotating fields produced by the stator windings are in like directions of rotation. With stator winding connections as shown, in FIGS. 3 and 4, closing switches 58 results in a series delta connection for a high speed setting wherein, for example, six poles are obtained in each of the stators. To change the speed of the motor to low speed, with switches 58 open, switches 57 are closed and a short circuit stator switch 67 is closed across leads to switches 58 to change the winding connection to parallel star whereby twice the number of poles or in this instance twelve poles are obtained. It should be noted that with one winding utilized on each stator, a salient pole connection is utilized to obtain the lower number of poles while a consequent pole connection results for the higher number of poles. Moreover, the number of poles may be varied to have different high and low motor speed settings in accordance with known A.-C. motor practice.

Turning to the rotor winding connections, since in the preferred embodiment a wound rotor is utilized, it is necessary to switch the rotor winding to obtain the same number of poles as are on each stator. The rotor windings pass through both portions of the rotor 29, 30 to corresponding slip rings 32 through 37 inclusive. The slip rings receive brushes 70 which are connected to auxiliary resistors shown at 71 for adjustment of the speed torque characteristics and which enable high torque to be achieved under starting conditions with the energy of slip dissipated in the form of heat safely outside of the motor. The brushes associated with slip rings 32 through 37, inclusive, are connected to the resistors through contact switches 75, 76.

For high speed operation of the motor, contacts 75 are closed, while contacts 76 remain open and there is no current flowing between slip rings 35, 36, 37 and their respective brushes. When the motor is switched to low speed operation, contacts 75 are opened, contacts 76 are closed, and a short circuit rotor switch 78 is closed to achieve the parallel star winding connection in the rotor. It will be appreciated that the switches 57 and the stator short circuit switch 67 in conjunction with producing the stator low speed poling; the switches 76 and rotor short circuit switch 78 utilized in conjunction with the rotor low speed poling are controlled via a main control switch 80, as seen in FIG. 1. Likewise, the high speed pole switches 58 and 75 for the stator and rotor, respectively, are controlled by main switch 80. Thus, the motor speed may be simply and easily selected under control of a single speed selection switch 80, with automatic switching to the proper number of poles in the rotor and stators. It will be appreciated that two or more distinct sets of windings may be utilized to change the number of poles for arriving at different selectable speeds.

In carrying out the present invention, means are provided for moving the two stators in opposite directions from the null phase position, upon positioning by a control member, and including provision for changing the neutral position of the stators so that the stator movement is increased and decreased at the high speed and low speed motor poling connections, respectively.

In the embodiment of the invention illustrated in FIGS. 1 and 2, there is provided a centrally pivoted lever 81 having a first end 82 which is connected to the stator arm 50 via an eye bolt connector member 83, and a second end 84 connected to the stator arm 51 via an eye bolt connection member 85. The lever 81 is centrally pivoted about a link 86 by pin 87, and the link 86 is secured to a fixed surface 88 which may, for example, be a vehicle frame or the motor housing. With the pivoted lever 81 having its ends connected to the stators and its neutral point anchored to a fixed support, the two stators are constrained to move equally in an opposite direction and substantially all of the reaction torque of the stators will be absorbed for easier control of the lever position.

In carrying out the present invention, manually controlled means are provided for tilting the pivoted lever 81 so that the stators are adjustably rotated with respect to one another at each selected motor speed setting to produce either a null condition in which the induced voltages are opposite in phase and cancel one another or a net induced voltage in the rotor winding for production of an output torque. In the illustrative form of the invention, the positioning control includes a manually controlled lever 90 which is secured to a quadrant gear 91, rotatably mounted on a fixed support 93. The quadrant gear 91 meshes with a gear 94, secured to a rotatable link 95 which, in turn, is attached to a positioning link 96. For the purpose of providing easier operation of the manually controlled lever 90, a fluid control booster cylinder 98 is provided with the booster being actuated by link 96. One end of the booster cylinder 98a is pivotally secured to the mounting frame 93, while the opposite end 98b is connected to the pivoted stator lever via a pin and slot arrangement, the purpose of which will become apparent as the discussion proceeds.

As shown in FIG. 1, the stators 40, 41 are so phased with respect to one another that when the arms 50, 51 occupy lower and upper positions (53b, 54a) in slots 53 and 54, respectively, and with the motor switch 80 in a high speed setting position, the stators define a "null" condition in which the induced voltages are opposite in phase and cancel one another. In order to achieve "forward," "neutral" and "reverse" operation of the motor when the control lever 90 is placed at the respective settings, a reversing contactor 100, in FIG. 4, is interposed between the three-phase supply line 62 and the two leads connected to the stators. The reversing contactor 100 is shown in the form of a switch 102 (FIG. 1) having a plunger 103. A cam surface 104 secured to the gear 94 on link 95 controls the reversing contactor such that forward rotation of the motor is obtained when the lever 90 is moved in one direction from "neutral," and "reverse" operation is obtained when the quadrant lever is moved in the opposite direction.

For the high speed setting, where the lower number of poles are selected, for example, four or six motor poles being utilized, the stator movement for production of full torque is to be twice that of the stator movement for the low speed setting where the higher number of poles, eight or twelve motor poles are utilized.

In accordance with one of the aspects of the present invention, means are provided for automatically shifting the stator control assembly simultaneously with the motor speed selection control, thereby increasing the stator movement for the high speed setting and decreasing the stator movement for the low speed setting. More specifically, in accordance with the present invention, the "neutral" position of the stators is automatically and correctively adjusted when switching the motor to its high and low speed settings under the control of speed control switch 80. This is accomplished in the present instance by positioning movable end 98b of the booster control along a slot 105 formed in the pivoted stator control lever 81 via an air or hydraulic operated servo 106. The servo 106 consists of a conventional double ended actuator having a plunger 108 connected to the end 98b of the booster 98, via a pin 109. Air or hydraulic fluid is supplied to servo 106 via supply lines 110, 111, connected to a double acting solenoid control valve 113 operated by speed control switch 80. Any suitable air or hydraulic system may be utilized to provide fluid pressure to inlet connections 114 for the solenoid control valve 113 and inlet connection 116 for the booster control 98. Suitable discharge leads 115, 117 are provided on the solenoid valve 113 and the booster 98, respectively.

The operation of the servo control 106 is such that when the control lever 90 is in the "neutral" position and when the motor control switch 80 is in the low speed position, the booster control end 98b occupies the dotted line position L in the slot 105, and the stator arms are in an alined position which is the same as the position shown in FIG. 1. Movement of the control lever 90 to the "forward" position tilts the pivot lever so that the stator arm 51 is rotated counterclockwise, as viewed from the left-hand end of the motor. The voltages induced by the stators in the rotor are thus moved into phase alinement, producing progressively increased torque. Moving the control lever 90 back to its "neutral" position serves to brake the motor to a stop and produce rotation of the rotor shaft in the opposite direction. If the control lever 90 passes through the "neutral" position, the reversing switch 102 and cam surface 103 reverse the connections of two of the three supply lines to produce a field which rotates in the opposite direction.

When the speed control switch 80 is thrown to the "high" position, servo control 106 returns the end 98b of the booster to the position H, and with the lever arm 90 in the neutral position, stator arms 50 and 51 occupy upper and lower positions 54a, 53b in slots 54, 53, respectively. Movement of the control lever 90 to either the "forward" or "reverse" positions results in movement by stator arm 50 in the counterclockwise direction and stator arm 51 in the clockwise direction, as viewed from the left end of the motor, due to the fact that the links 95 and 102 pass over center, with the result that travel by the stator arms from zero to maximum torque position for high speed operation is twice that of the stator arm movement from zero to maximum torque position for low speed motor operation.

Figure 7:
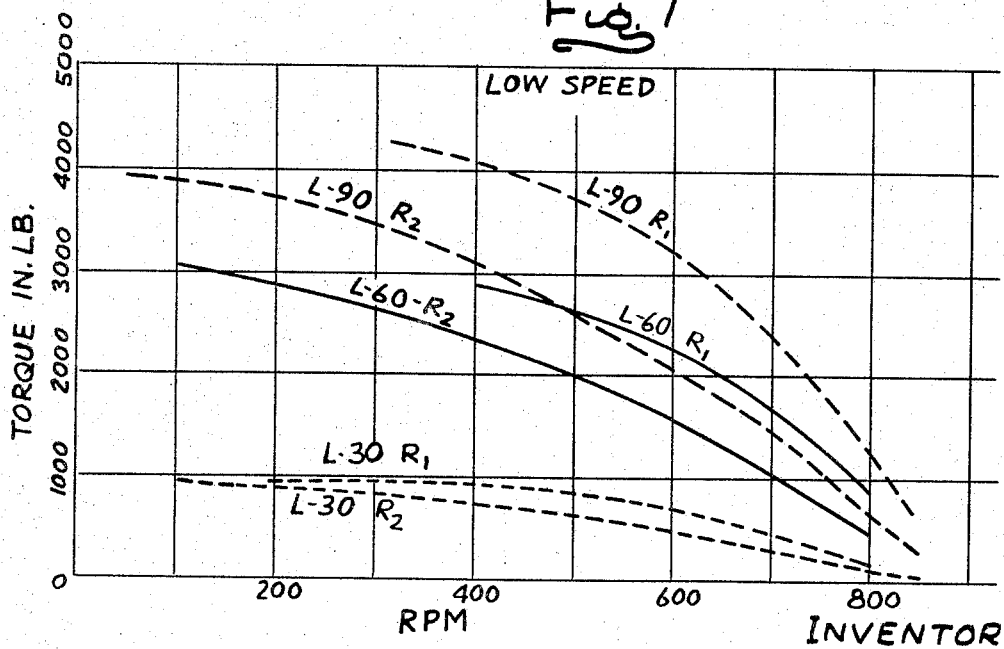
FIG. 7 shows a family of speed torque curves obtainable at successive stator settings at low speed operation.
Figure 8:
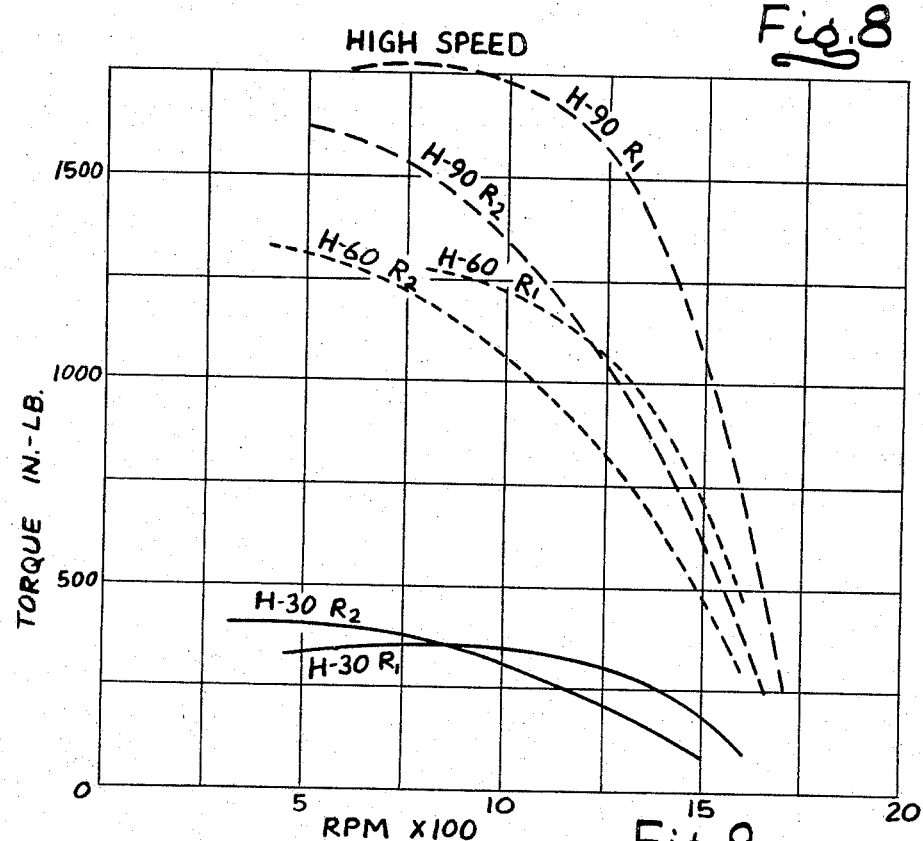
FIG. 8 shows a family of speed torque curves obtainable at successive stator settings at high speed operation.

Referring to FIG. 6, there is shown an illustrative family of motor horsepower versus speed curves obtainable at successive stator positions and with an assumed resistance in the rotor circuit to provide good starting torque. A wide range of speeds are available with the present motor, and it will be apparent from FIG. 6 that the motor horsepower is constant or substantially constant for high and low speed settings at corresponding respective, angular stator positions with respect to the neutral positioning of the stators designated L-30, H-30; L-45, H-45; L-60, H-60; and L-90, H-90. With the windings such that the greater number of poles producing low speed operation are full pitch coils, the magnetic flux density is much greater in low speed than in high speed, where there are lesser numbers of poles. Thus, referring to FIGS. 7 and 8 conjointly, there is shown speed torque curves for low speed (FIG. 7) and high speed (FIG. 8) motor operation at successive stator positions and with different resistance values R1, R2 in the rotor circuit. It can be readily seen, that the present motor provides approximately twice the torque output at one-half motor speed, that is, a high output torque is obtained at lower speeds with the production of approximately one-half the output torque obtained when the speed is doubled. The present motor and control system are particularly well suited for use as a transmission or the like where high torque, low speeds are needed for starting and pulling under loads while enabling shifting to lower torque high speeds for normal running operation under low loads.

Figure 9:
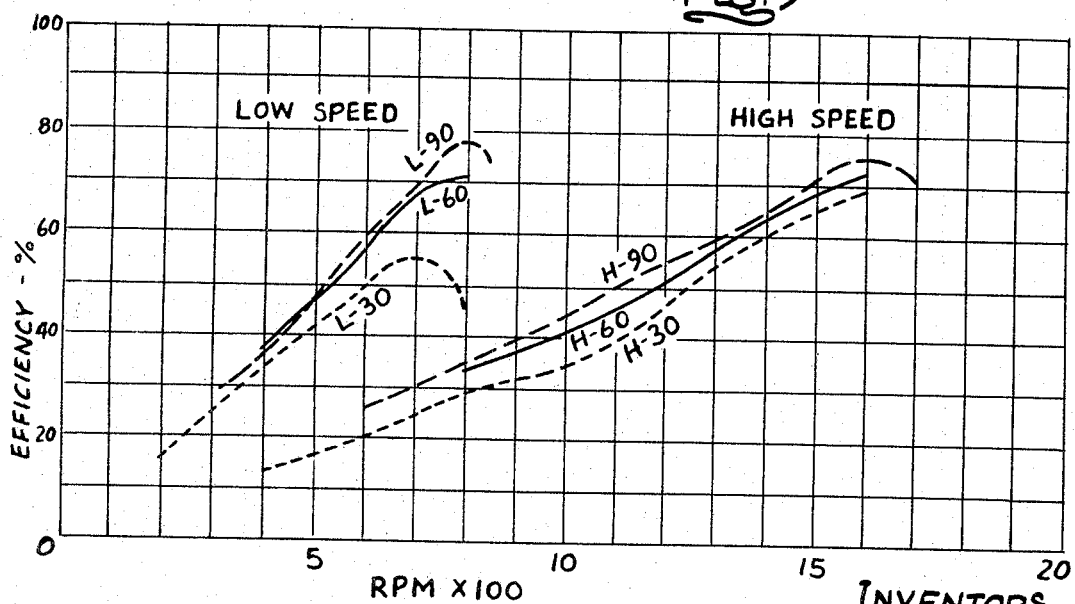
FIG. 9 shows a family of motor efficiency versus speed curves obtainable at successive stator positions in high and low motor speeds, respectively.

Another advantage of the present motor and control arrangement is that the efficiency is substantially as high at half speed as is obtained at full speed. FIG. 9 shows the efficiency for low and high speed operation obtained at corresponding stator positions L-30, L-60, L-90 and H-30, H-60, H-90, respectively. The present motor is capable of delivering a varying speed characteristic low speed and high torque at one end of the speed range, and high speeds with low torque at the other end of the speed range. Thus, the motor can be operated at adjustable-constant speed or adjustable varying speed to fit a vast variety of industrial applications.

It will be appreciated from the foregoing that the present invention will find particularly advantageous application, but by no means exclusive use, in performance of propelling, steering and braking functions for vehicles but without the necessity for expensive transmissions or braking systems normally utilized.

We claim as our invention:

1. A variable speed A.-C. motor comprising, in combination, a frame, first and second stator assemblies on said frame having substantially identical windings for producing rotating fields, means for switching said stator windings to produce first and second predetermined numbers of winding pole connections, said first pole connection being one-half the number of poles of said second connection, a wound rotor in said frame having a single set of windings in which voltages are induced by the stator fields, means for switching said rotor windings to obtain a corresponding number of poles to said stators, and each of said stators being rotatably movable in said frame between a null phase relation in which the induced voltages are cancelled and an alined phase relation in which the induced voltages are additive for production of maximum torque.

2. A variable speed A.-C. motor as claimed in claim 1 wherein said stator and rotor winding switching means are interconnected so that corresponding pole connections are simultaneously obtained in said rotor and said stators.

3. A variable speed A.-C. motor comprising, in combination, a frame, first and second stator assemblies on said frame having substantially identical windings for producing rotating fields, means for switching said stator windings for producing varying numbers of poles whereby a series delta connection is produced for high speed operation and a parallel star connection is produced for low speed operation, a rotor in said frame having a single set of windings in which voltages are induced by the stator fields, means for switching said rotor winding to obtain a corresponding number of poles to said stators, including a series delta connection and a parallel star connection for high and low speed operation, respectively, and each of said stators being rotatably movable in said frame between a null phase relation in which the induced voltages are cancelled and an alined phase relation in which the induced voltages are additive so that the speed of the motor can be further varied between said high and low speed settings.

4. A variable speed A.-C. motor comprising, in combination, a frame, first and second stator assemblies on said frame having substantially identical windings for producing rotating fields, means for switching said stator windings to produce first and second predetermined numbers of winding pole connections for production of rotating fields of first and second speed, a wound rotor in said frame having a single set of windings in which voltages are induced by the stator fields, means for switching said rotor winding to obtain a corresponding number of poles to said stators, each of said stators being rotatably movable in said frame, control means including a lever interconnecting said stators for rotating said stators a first predetermined amount with respect to one another between a null phase relation in which the induced voltages are cancelled and an alined phase relation in which the induced voltages are additive for production of maximum torque at said first pole connection, means for changing said control means movement for rotating said stators a second predetermined amount with respect to one another between a null phase relation in which the induced voltages are cancelled and an alined phase relation in which the induced voltages are additive for production of maximum torque at said second pole connection.

5. A variable speed A.-C. motor comprising, in combination, a frame, first and second stator assemblies on said frame having substantially identical windings for producing rotating fields, means for switching said stator windings to produce first and second predetermined numbers of winding pole connections, said first pole connection being one-half the number of poles of said second connection for production of rotating fields of first and second speeds, a wound rotor in said frame having a single set of windings in which voltages are induced by the stator fields, means for switching said rotor winding to obtain a corresponding number of poles to said stators, each of said stators being rotatably movable in said frame, a centrally pivoted lever, means for coupling the ends of said lever to said stators, a control member coupled to said lever having a shiftable pivot connection therewith, means for moving said control member to pivot said lever so that said stators move in first equal and opposite amounts from a null phase position for progressive increase in output torque at said first pole connections, means for shifting said control member pivot connection so that said lever moves in second equal and opposite amount approximately one-half said first amount at said second pole connection.

6. A variable speed A.-C. motor comprising, in combination, a frame, first and second stator assemblies on said frame having substantially identical windings for producing rotating fields, means for switching said stator windings to produce first and second predetermined numbers of winding pole connections for production of rotating fields of first and second speeds, a wound rotor in said frame having a single set of windings in which voltages are induced by the stator fields, means for switching said rotor winding to obtain a corresponding number of poles to said stators, each of said stators being rotatably movable in said frame between a null phase relation in which the induced voltages are cancelled and an alined phase relation in which the induced voltages are additive for production of maximum torque, a centrally pivoted lever, means for coupling the ends of said lever to said stators, a control member having means shiftably coupled to said lever for moving said stators in equal and opposite directions from a first null phase position at said first pole connection, so that the output torque goes from maximum to zero and then again to maximum during continuous movement of the control member, means for shifting said coupling means so that said lever moves in equal and opposite amounts from a second null phase position at said second pole connection so that the output torque goes from maximum to zero and then again to maximum during continuous movement of the control member, and means for reversing the stator windings with respect to the current source when control members move through each of its zero torque positions.

7. A variable speed A.-C. motor comprising, in combination, a frame, first and second stator assemblies on said frame having substantially identical windings for producing rotating fields, means for switching said stator windings to produce first and second predetermined numbers of winding pole connections for production of rotating fields of first and second speeds, said first pole connection being one-half the number of poles of said second connection, a wound rotor in said frame having a single set of windings in which voltages are induced by the stator fields, means for switching said rotor winding to obtain a corresponding number of poles to said stators, each of said stators being rotatably movable in said frame between a null phase relation in which the induced voltages are cancelled and an alined phase relation in which the induced voltages are additive for production of maximum torque, a centrally pivoted lever, means for coupling the ends of said lever to said stators, a control member having means shiftably coupled to said lever for moving said stators in equal and opposite amounts from a first neutral position corresponding to said first pole connection, so that the output torque goes from maximum to zero and then again to maximum during continuous movement of the control member, means for shifting said coupling means so that said lever moves in equal and opposite amounts approximately one-half said first amounts from a second neutral position corresponding to said second pole connection, and means for reversing the stator windings with respect to the current source as the control member is moved through each of said first and second neutral positions.

8. A variable speed A.-C. motor comprising, in combination, a frame, first and second stator assemblies on said frame having substantially identical windings for producing rotating fields, means for switching said stator windings to produce first and second predetermined numbers of winding pole connections for production of rotating fields of first and second speeds, a wound rotor in said frame having windings in which voltages are induced by the stator fields, means for switching said rotor windings to obtain a corresponding number of poles to said stators, a speed selection switch connected to said stator and rotor switching means for simultaneously obtaining the same number of poles in said stators and said rotor, each of said stators being rotatably movable in said frame, a pivoted lever having its ends coupled to said stators for rotation therewith, a manually operated control member having means shiftably coupled to said lever for moving said stators in equal and opposite directions from an alined phase relation in which the induced voltages are additive for production of maximum torque to a null phase relation in which the induced voltages are cancelled and then again to an alined phase relation during continuous movement of said manually operated member, fluid actuator means connected to said speed selection switch for shifting the neutral position of said lever so that the relative stator movement controlled by said manually operated lever is increased and decreased according to the number of winding pole connections simultaneously with said speed selection switch setting.

9. A variable speed A.-C. motor comprising, in combination, a frame, first and second stator assemblies on said frame having substantially identical windings for producing rotating fields, means for switching said stator windings for producing varying numbers of poles whereby a series delta connection is produced for high speed operation, and a parallel star connection is produced for low speed operation, a rotor in said frame having a single set of windings in which voltages are induced by the stator fields, means for switching said rotor winding to obtain a corresponding number of poles to said stators, including a series delta connection and a parallel star connection for high and low speed operation, respectively, each of said stators being rotatably movable in said frame, a centrally pivoted lever having its ends coupled to said stators for rotation therewith, a manually operated control member having means shiftably coupled to said lever for moving said stators in equal and opposite directions from an alined phase relation in which the induced voltages are additive for production of maximum torque to a null phase relation in which the induced voltages are cancelled and then again to an alined phase relation during continuous movement of said manually operated member, and means for shifting the neutral position of said lever so that the relative stator movement controlled by said manually operated lever is increased and decreased for said high and low speed connections, respectively.

References Cited

UNITED STATES PATENTS

| | | | |
|---|---|---|---|
| 1,492,216 | 4/1924 | Nehlsen | 318—226 |
| 2,317,266 | 4/1943 | Galt | 318—226 |
| 2,600,523 | 6/1952 | Ellis | 318—243 |
| 3,290,574 | 12/1966 | Roe | 318—243 X |

ORIS L. RADER, *Primary Examiner.*

G. Z. RUBINSON, *Assistant Examiner.*